(12) United States Patent
Arfvidsson et al.

(10) Patent No.: US 9,369,679 B2
(45) Date of Patent: Jun. 14, 2016

(54) SYSTEM AND PROCESS FOR PROJECTING LOCATION-REFERENCED PANORAMIC IMAGES INTO A 3-D ENVIRONMENT MODEL AND RENDERING PANORAMIC IMAGES FROM ARBITRARY VIEWPOINTS WITHIN THE 3-D ENVIRONMENT MODEL

(75) Inventors: Joakim Arfvidsson, Palo Alto, CA (US); Sebastian Thrun, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 2804 days.

(21) Appl. No.: 11/837,224

(22) Filed: Aug. 10, 2007

(65) Prior Publication Data
US 2008/0106593 A1  May 8, 2008

Related U.S. Application Data

(60) Provisional application No. 60/864,762, filed on Nov. 7, 2006.

(51) Int. Cl.
| | | |
|---|---|---|
| *H04N 7/00* | (2011.01) | |
| *H04N 7/18* | (2006.01) | |
| *G06T 3/00* | (2006.01) | |
| *G06T 15/20* | (2011.01) | |

(52) U.S. Cl.
CPC .............. *H04N 7/181* (2013.01); *G06T 3/0062* (2013.01); *G06T 15/205* (2013.01)

(58) Field of Classification Search
CPC .............. H04N 7/181; H04N 13/0055; H04N 13/0497; H04N 13/044; H04N 13/0475; G06T 3/0062

USPC ............................................ 345/716; 348/39
See application file for complete search history.

(56) References Cited

U.S. PATENT DOCUMENTS

| 5,495,576 A | 2/1996 | Ritchey |
| 5,657,073 A | 8/1997 | Henley |
| 6,011,558 A | 1/2000 | Hsieh et al. |

(Continued)

OTHER PUBLICATIONS

Levoy et al.; "Light Field Rendering;" Computer Graphics (SIGGRAPH 1996): 30, 31-34.

(Continued)

*Primary Examiner* — Robert B Harrell
(74) *Attorney, Agent, or Firm* — KPPB LLP (57) ABSTRACT

A system and process of morphing location-referenced panoramic images into views at nearby locations. When using panoramic images in an interactive tour, a user might desire to see the environment from viewpoints for which no panoramic images are available. This invention makes this possible. It enables a user to experience views from arbitrary locations in the environment, so as long as one or more panoramic images are available at nearby locations. In particular, this invention makes it possible to combine two non-overlapping geo-referenced panoramic video streams into a new video stream which seamlessly transitions between these streams. When used in a client-server architecture, this invention also makes it possible for the server to transmit a sparse sequence of panoramic images, and provide the user with a dense panoramic video stream, by synthesizing the missing panoramic images. Said system and process is also applicable to incomplete panoramic images, photographs, and video.

10 Claims, 10 Drawing Sheets

(56) References Cited

U.S. PATENT DOCUMENTS

| | | | |
|---|---|---|---|
| 6,559,846 | B1 | 5/2003 | Uyttendaele et al. |
| 6,831,643 | B2 | 12/2004 | Aliaga et al. |
| 6,859,557 | B1 | 2/2005 | Uyttendaele et al. |
| 6,895,126 | B2 | 5/2005 | Di Bernardo et al. |
| 6,968,973 | B2 | 11/2005 | Uyttendaele et al. |
| 7,027,049 | B2 | 4/2006 | Aliaga et al. |
| 7,096,428 | B2 | 8/2006 | Foote et al. |
| 7,239,760 | B2 | 7/2007 | Di Bernardo et al. |
| 7,577,316 | B2 | 8/2009 | Di Bernardo et al. |
| 7,805,025 | B2 | 9/2010 | Goncalves et al. |
| 7,813,596 | B2 | 10/2010 | Di Bernardo et al. |
| 8,213,749 | B2 | 7/2012 | Di Bernardo et al. |
| 8,818,138 | B2 | 8/2014 | Di Bernardo et al. |
| 2004/0239699 | A1* | 12/2004 | Uyttendaele et al. ......... 345/716 |

OTHER PUBLICATIONS

Chen; "QuickTime VR—An image based approach to virtual environmental navigation," Computer Graphics (SIGGRAPH'95). Aug. 1995, pp. 29-38.

Shum et al.; "Rendering with Concentric Mosaics;" Computer Graphics (SIGGRAPH '99), pp. 299-306, 1999.

Lippman; "Movie-Maps: An Application of the Optical Videodisc to Computer Graphics:" SIGGRAPH '80; vol. 14(3); Jul. 1980; pp. 32-42.

Brooks; "Walkthrough—a dynamic graphics system for simulating virtual buildings;" Workshop on Interactive 3D Graphics 1986, pp. 9-21.

Boult; "Remote reality via omnidirectional imaging;" SIGGRAPH 1998 Technical Sketch, p. 253.

Broida et al.; "Recursive 3-D Motion Estimation from a Monocular Image Sequence;" IEEE Transactions on Aerospace and Electronic Systems: 26(4), pp. 639-656, 1990.

Corke et al.; Omidirectional Visual Odometry for a Planetary Rover; Proceedings of 2004 IEEE/RSJ International Conference on Intelligent Robotics and Systems; pp. 4007-4012; Sep. 28-Oct. 2, 2004.

Gutmann et al.; "AMOS: Comparison of Scan Matching Approaches for Self-Localization in Indoor Environments;" Proceedings of the 1st Euromicro Workshop on Advanced Mobile Robots; IEEE Computer Society Press, 1996.

Blake et al.; "Active contours : The Application of Techniques from Graphics, Vision, Control Theory and Statistics to Visual Tracking of Shapes in Motion;" Springer, Berlin.

* cited by examiner

SYSTEM AND PROCESS FOR PROJECTING LOCATION-REFERENCED PANORAMIC IMAGES INTO A 3-D ENVIRONMENT MODEL AND RENDERING PANORAMIC IMAGES FROM ARBITRARY VIEWPOINTS WITHIN THE 3-D ENVIRONMENT MODEL

CROSS REFERENCE TO RELATED APPLICATIONS

This application claims the benefit under 35 U.S.C. §119 (e) of U.S. Provisional Patent Application Ser. No. 60/864,762, entitled "System and Process for Synthesizing Location-Referenced Panoramic Images and Video" by Joakim Arfvidsson and Sebastian Thrun, filed Nov. 7, 2006, which is hereby incorporated by reference.

BACKGROUND OF THE INVENTION

1. Field of the Invention

The invention is related to video tours, and more particularly to interactive video tours using a image-based rendering techniques for exploring remote real-world locations.

2. Description of the Related Art

For more than a decade, interactive video tours have been of great interest to people. People often desire to visually explore remote locations. Video tours have provided users with the ability to view and explore such locations. Video tours are based on the idea of viewing sequences of images or video previously acquired at remote locations. A viewer enables a user to interactively view such images or videos, so that the impression of a virtual tour is generated.

The idea of video tours goes back to Lippman, who in his seminal "Movie Maps" project developed an early such system. This project is described in Lippman, A., "Movie maps: An application of the optical videodisc to computer graphics," Computer Graphics (SIGGRAPH'80), vol. 14(3), July 1980, pp. 32-43. His system was based on a collection of photographs acquired by driving through an urban environment. It allowed the user to interactively navigate through these clips. Boult extended this idea into the use of panoramic images and video, in the paper by Boult, T. E., "Remote reality via omnidirectional imaging," SIGGRAPH 1998 Technical Sketch, p. 253. The use of panoramic images enables a user to change her viewing direction at will, increasing the perceived control of a user over the contents of the tour. Similar systems were developed by Uyttendaele et al., U.S. Pat. No. 6,968,973 and Foote et al., U.S. Pat. No. 7,096,428. These inventions develop interactive mechanisms that enabled users to navigate through panoramic video along virtual paths. Their systems provide the user with freedom to chose the tour direction, speed, viewing angle, and zoom level at will.

In all these systems, the user must abide to the exact same path along which the original video or image data was acquired. Thus, for any path chosen by a user, sequences of panoramic images must be available. However, collecting such images may be impossible, or uneconomical. This problem is paramount for urban environments. Here the motion of the camera during image acquisition may be severely limited. For example, a data acquisition vehicle may be prohibited from executing a specific motion which a virtual tourist may desire to explore. In such situations, the set of panoramic images is incomplete. The database will lack the necessary panoramic images for enabling the user to follow the desired motion direction. As a result, the motion of the user will be limited, and it may be impossible to provide a realistic tour through such environments.

This limitation is overcome by synthesizing new panoramic views from the views in the image database. The common approach is based on seminal work by Levoy and Hanrahan. The light field technique is disclosed in a paper entitled "Light Field Rendering," by M. Levoy and P. Hanrahan, Computer Graphics (SIGGRAPH '96), pp. 171-80, 1996, and in U.S. Pat. No. 6,097,394, issued Aug. 1, 2000. This technique requires as input a multitude of images, acquired at nearby locations. By stitching together areas from multiple images taken at different locations, hypothetical new images can be synthesized for arbitrary nearby viewing locations. This idea has been extended to sets of panoramic images acquired over irregular grids of view points by Aliaga et al., see U.S. Pat. Nos. 7,027,049 and 6,831,643. By combining image segments from multiple such images, new views can be synthesized for arbitrary nearby locations. However, such an approach suffers from two limitations. First, in many application domains the collection of a grid of panoramic images may be uneconomical or infeasible. For example, when building virtual tours for entire cities, it may be uneconomical to traverse streets more than once. Moreover, certain locations may never be entered, e.g., because of obstacles that prohibit a vehicle from moving there. Second, and more importantly, cities are full of moving objects, hence the appearance of urban locations vary with time. Images acquired sequentially (e.g., by a moving vehicle) may hence be mutually inconsistent. When stitching together images in such environments using sequentially acquired image streams, the resulting synthetic views may appear unrealistic. For example, when stitching together images containing a moving vehicle, recorded at different points in time, the resulting panorama may contain part of a car, which is not a realistic image. In such situations, a combined image generated by stitching together sub-regions from different images may look unrealistic.

When viewing panoramic images, a user might want to move freely, without consideration of the specifics of the data acquisition process; further, a user might want to see images free of motion artifacts that arise when stitching together multiple panoramic images. This motivates the problem of generating synthetic views from individual panoramic images, and in ways that do not require a dense grid of image recording locations.

SUMMARY OF THE INVENTION

Embodiments according to the present invention provide systems and processes for synthesizing novel panoramic images from a multitude of location-referenced panoramic images. Given the availability of panoramic images with associated location information, embodiments make it possible to render a new view that corresponds to a user-selected viewing location, which may not be part of the available pre-recorded images.

The embodiments render a new view by projecting one or more nearby panoramic images onto a crude 3-D model of the environment. In one embodiment, this 3-D model is simply a sphere of fixed diameter. In other embodiments, this model is derived from explicit 3-D model of the environment. Embodiments according to the invention render new panoramic images from this 3-D model for arbitrary nearby locations, by shifting and rotating the view point accordingly. Multiple such rendering may be generated from multiple nearby panoramas. Such views are then combined into a single panorama by blending these images together, using a blending function that is monotonic in the distance between the new viewpoint and the acquisition locations of the original images.

Embodiments according to the invention include the synthesis of entire video streams. For example, the embodiments make it possible to bridge the gap between two separate panoramic image sequences whose acquisition locations are close but do not overlap. In this case, the embodiments compute a transition sequence of locations between these video streams, which minimize a multitude of criteria. These criteria might include the smoothness of the path between the image sequences and the proximity of the path to the locations of the available images. The system and process disclosed herein provide for the rendering of new panoramic images for all locations along the path. The resulting transition video will enable a user to navigate between panoramic video sequences recorded at nearby, non-overlapping locations.

Even if the video locations overlap, embodiments according to the present invention may provide for a more pleasant viewing experience. For example, the paths between two overlapping image sequence may be odd, and a user transitioning from one sequence to another may intuitively prefer a smoother and more direct path. The embodiments will enable the viewer to generate synthetic panoramic video from a smoother and more natural path, thereby enhancing the viewing experience during an interactive tour.

Embodiments according to the invention are also applicable to the problem of low-bandwidth video transmission in interactive video tours. Instead of transmitting a full video stream, the embodiments make it possible to transmit a sparse set of panoramic images, with associated locations. The views of intermediate locations can then be synthesized using the system and methods disclosed herein. In particular, when applied to a client-server architecture, the embodiments make it possible to reduce the bandwidth of a panoramic video stream for interactive video tours.

Embodiments according to the present invention also apply to partial panoramic images, photographs, and other images. In a client-server architecture, the embodiments may be applied to the server side to process video data offline, to generate synthetic video of new motion paths. It may equally be applied to the client side, where the embodiments may, for example, reduce communication bandwidth.

BRIEF DESCRIPTION OF THE DRAWINGS

The present invention will become more fully understood from the detailed description given below and the accompanying drawings. These descriptions and drawings are given for purposes of illustration only, and thus do not limit the present invention.

DETAILED DESCRIPTION OF THE PREFERRED EMBODIMENT

Figure 1:
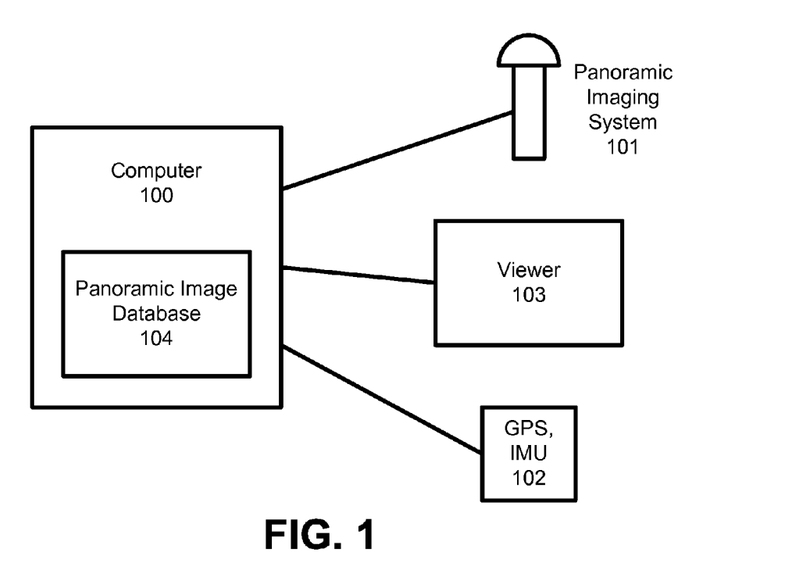
FIG. 1 is a block diagram of a system according to the present invention.

The preferred embodiment of the invention disclosed herein is shown in FIG. 1. A computer system 100 is connected to a panoramic imaging system 101, a positioning system 102, and a viewer 103. The computer system 100 stores a panoramic image database 104. The viewer 103 might be connected to the computer system 100 via the Internet as would the case for a client server system, or it may be the part of the same computer system.

One or more sequences of panoramic images are acquired using a panoramic imaging system 101. Those skilled in the art recognize that there exists a plurality of panoramic imaging systems. For example, panoramic images may be acquired by a camera with a parabolic mirror, or by a camera rig with multiple cameras whose fields of view partially overlap, and which uses computer software to combine same into panoramic images.

In the preferred embodiment, these images are annotated with the location of the panoramic imaging system 101 at the time of image acquisition. The location information is obtained via a positioning system 102. In many embodiments, the location of the image will be expressed by three Cartesian coordinates, (x,y,z). Such location information may be acquired using a satellite GPS (global positioning system) and IMU (inertial measurement unit). In related embodiments, the images will also be annotated by the orientation of the camera rig, expressed in Euler angles. Those skilled in the art realize that there exists a plurality of methods for determining the location and orientation of an imaging sensor relative to a fixed coordinate system, and the use of GPS and IMU shall be considered examples, which do not limit the scope of the present invention.

All panoramic images annotated with their locations together comprise the annotated image database 104. In the preferred embodiment, this database 104 is stored on the computer system 100.

In the preferred embodiment, a user may wish to render a view of the environment at a specific location Y, in viewer 103. This wish may arise when engaging in a "virtual tour" of the environment captured in the annotated image database. If the annotated image database 104 contains a panoramic image for this desired location, the viewer 103 may simply use this image to render the requested view. The rendering of a view may involve the selection of a sub-region of the panoramic image, and the display at a user-selected magnification (zoom). Those skilled in the art realize there exist many different methods for rendering panoramic images.

Figure 2:
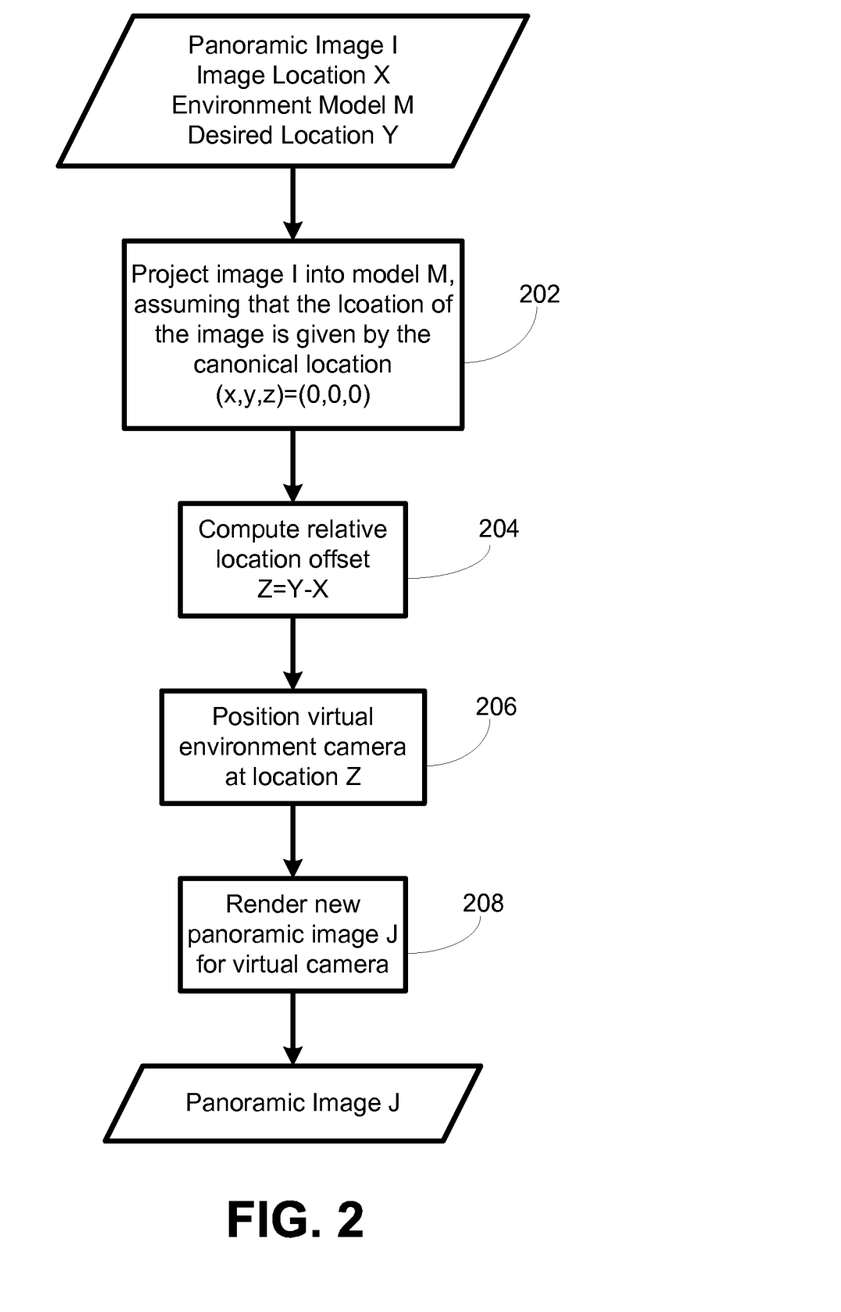
FIG. 2 a flowchart of the image warping algorithm, for a single panoramic image

However, the desired location may not be contained in the prerecorded database 104. The present invention synthesizes a panoramic image from one or more panoramic images in the database. The main procedure for warping an existing panoramic image in the database 104 into a new, synthetic image is depicted in FIG. 2. The procedure in this figure accepts as input a panoramic image I acquired at location X. It also requires a geometric environment model M. In the preferred embodiment, this model is a sphere of fixed diameter, centered at X. The method disclosed here projects the panoramic image onto this sphere. It then places a virtual panoramic imaging sensor at some other location Y. This location is also provided as input to said procedure. The invention then uses standard image rendering techniques to synthesize a panoramic image for this sensor location Y.

In step 202 the preferred method projects an image I into an environment model M, assuming that the location of the image is given by the canonical location (x,y,z)=(0,0,0). In step 204 it computes the relative location offset Z=Y−X. In step 206 the virtual environment camera is positioned at location Z. In step 208 the method renders the new panoramic image J for the virtual camera.

Figure 3:
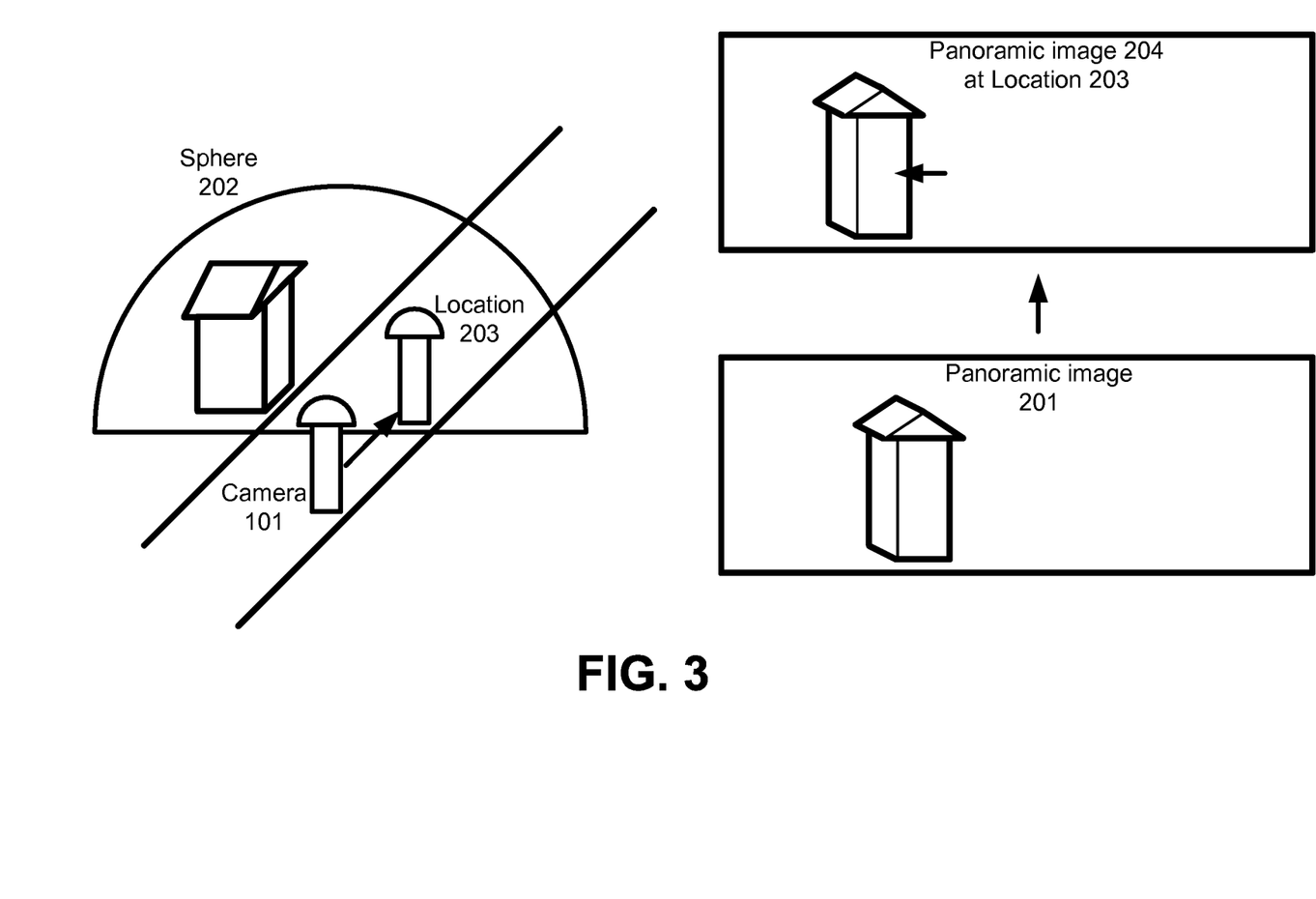
FIG. 3 illustrates the image warping process, using a sphere as environment model FIG. 4 a flowchart of the algorithm for generating a transition video between two panoramic video sequences FIG. 5 a flowchart of the algorithm for identifying transition points in two panoramic videos.

Those skilled in the art realize that standard rendering techniques can be applied to synthesize such a panoramic camera image at location Y. Modern graphics processors provide for rendering engines that can efficiently perform the projection of the panoramic image onto environment models such as spheres, and the rendering of new panoramic views from nearby viewing locations. FIG. 3 illustrates the warping process using a sphere as an environment model. It shows the projection of a panoramic image 201 into the sphere 202, and the rendering of a warped panoramic image 204 for a location 203 in this sphere.

In some cases, there may exist a plurality of panoramic images in the annotated image database that can be used to generate a view for a given location Y. In such situations, the preferred embodiment combines two or more panoramic images into a single new panoramic image. In detail, the preferred embodiment applies the image warping procedure in FIG. 2 to each such panoramic image individually. Each of these warping operations yields an individual synthesized panoramic image for the desired viewing location Y.

Figure 4:
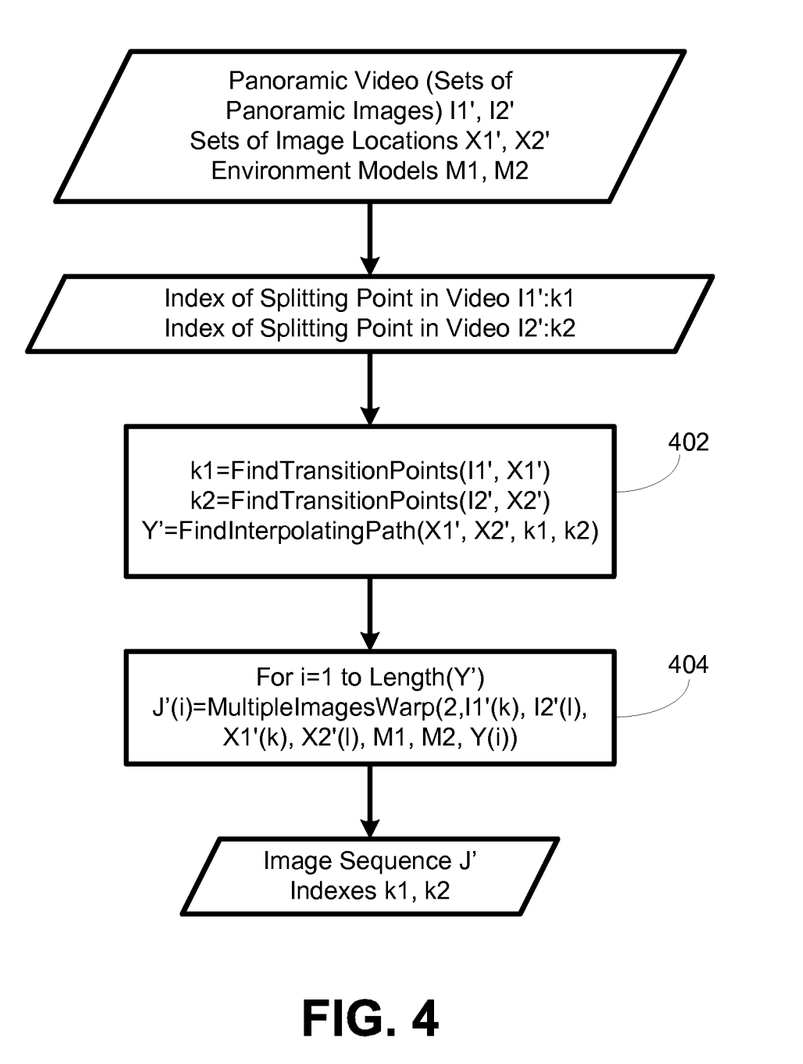

The procedure in FIG. 4 blends these images into a single panoramic image, using weighted blending. Those skilled in the art realize there exists many different blending techniques for combining multiple images into a single image. In exemplary step 402 using the variables panoramic video (sets of panoramic images) I1', I2'; sets of image locations X1', X2'; environment models M1, M2; an index of splitting point in Video I1': k1 and an index of splitting point in Video I2': k2, the operations, k1=FindTransitionPoints(I1', X1'); k2=FindTransitionPoints(I2', X2') and Y'=findInterpolatingPath(X1', X2', k1, k2) are performed. Then in step 404 the warped image sequence is developed using the operation J'(i)=MultipleImagesWarp(2, I1'(k), I2'(1), X1'(k), X2'(1), M1, M2, Y(i)) for the length Y. An image sequence J' and indexes k1 and k2 are developed.

Embodiments according to the present invention may be used to synthesize smooth virtual tours from multiple non-overlapping panoramic video streams. In general, video tours require the display of smooth video along a user-selected path. Sometimes the prerecorded images may not be suited for smooth video display along a user-selected path. For example, when collecting panoramic video of a city using a vehicle equipped with a panoramic image sensor and with GPS and IMU systems, the environment may make it impossible to collect panoramic video streams for certain desirable paths. For example, it may be illegal to take certain turns, yet a user exploring the environment in a virtual tour might wish to take such a turn. Not being able to do so may feel odd to a user. When acquiring image data with moving vehicles in urban environments, individual video sequences often naturally disconnected at intersections, or they connect in ways that, when replayed accordingly, induce unintuitive viewing motion.

In such situations, the embodiments generate a positive viewing experience through smooth and intuitive panoramic video, generated from images in the annotated image database 104. In particular, assume that a user would like to transition smoothly from a panoramic video I1' to a video I2'. In a virtual city tour, these panoramic videos may have been recorded in two adjacent streets, but without a suitable transition. In this case, just pasting them together may result in an unsmooth or unintuitive transition.

Figure 5:
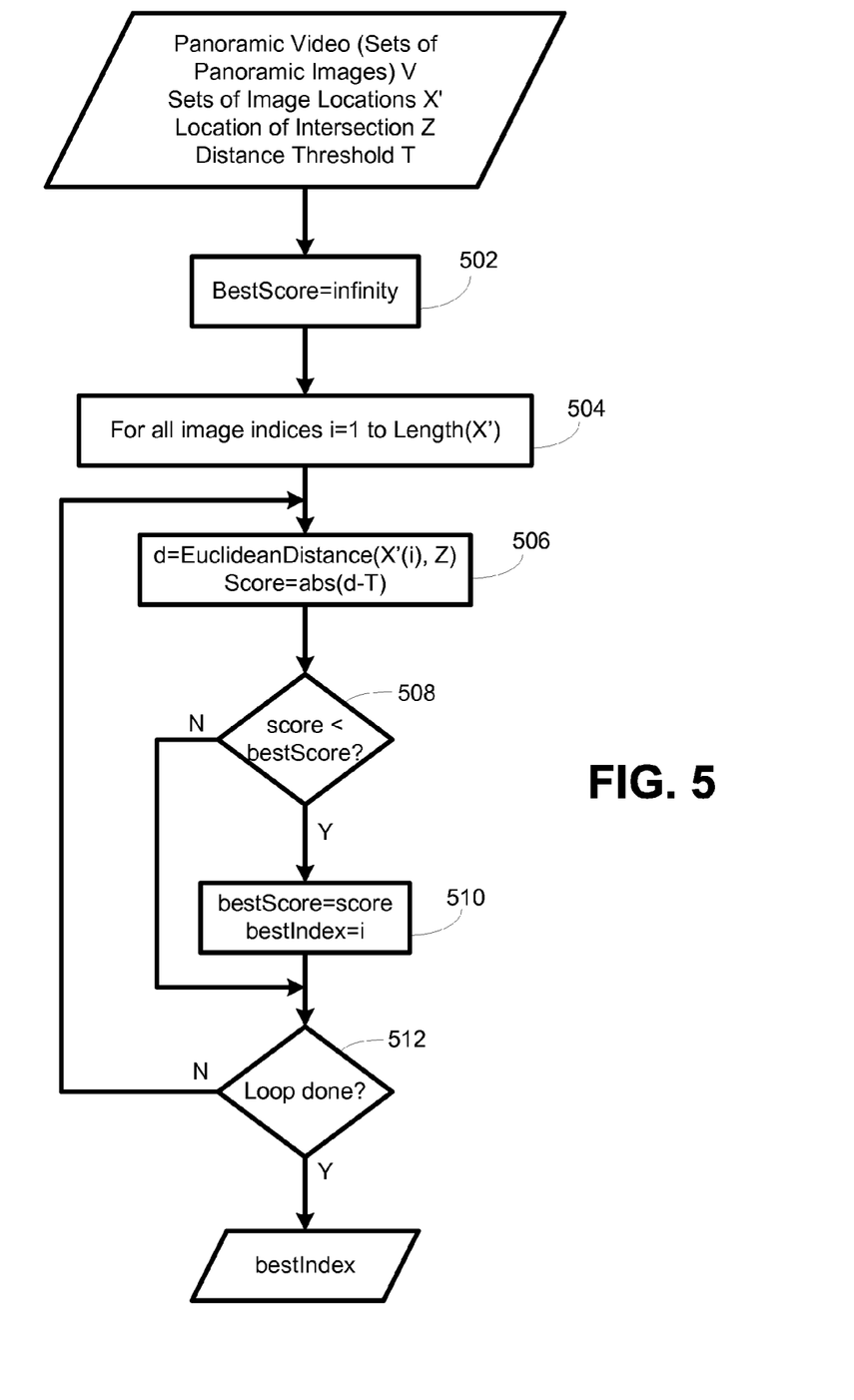
Figure 6:
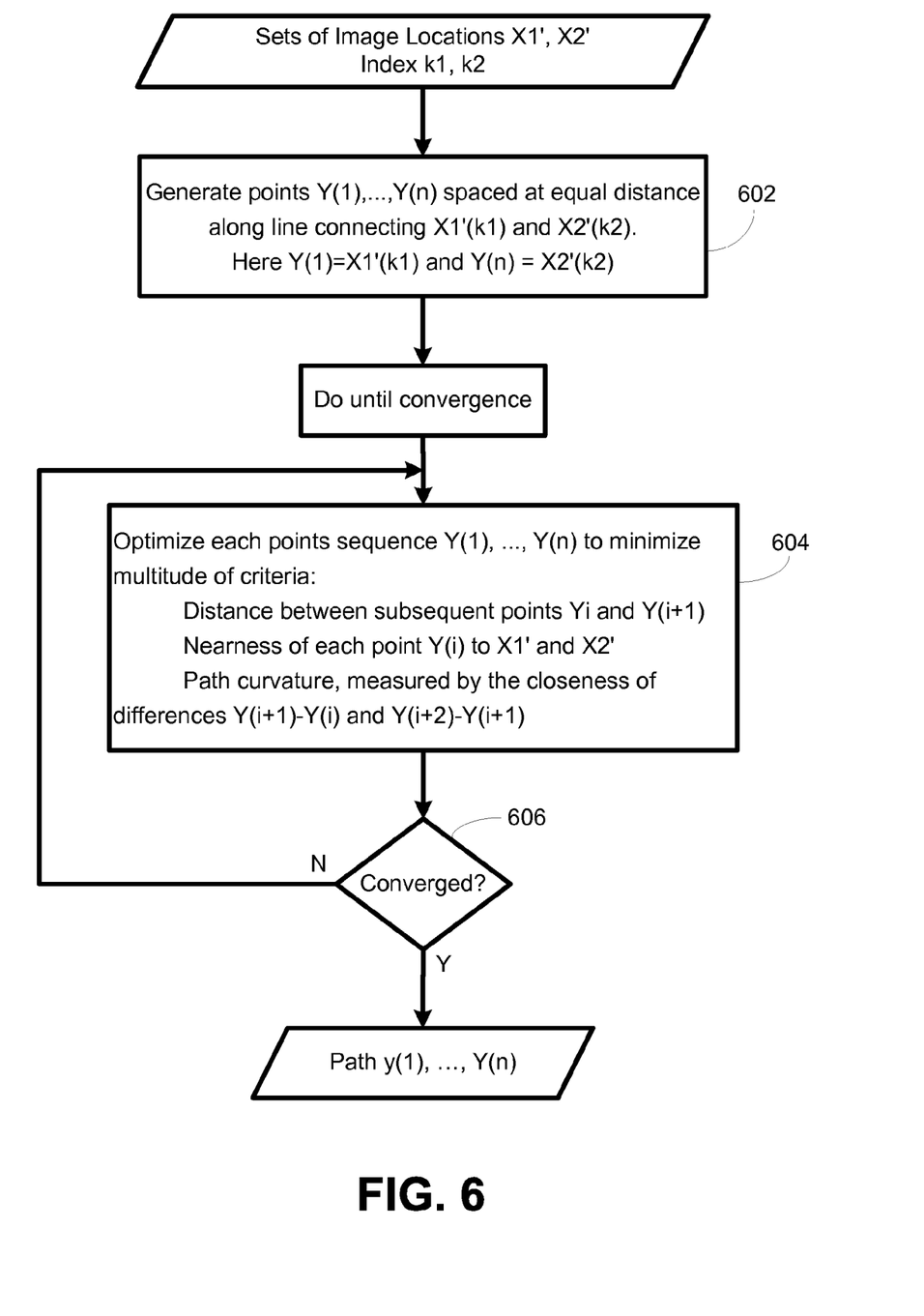
FIG. 6 a flowchart of the algorithm for completing a path between two reference coordinates FIG. 7 a flowchart of the image synthesis algorithm for combining multiple panoramic images.

FIG. 4 displays the procedure for generating a smooth panoramic video that transitions from one video to another; included in this procedure are two subroutines depicted in FIGS. 5 and 6.

The procedure in FIG. 5 identifies two discrete transition locations, one in each video. In the preferred embodiment these locations are chosen to be at an approximate fixed distance to a virtual intersection point, which may be the center of an intersection in an urban environment. The preferred embodiment then generates a new, smooth path between the two videos, which connects the two transition locations. The generation of this path is the result of a path optimization procedure, depicted in FIG. 6.

The operation of FIG. 5 uses inputs of panoramic video (sets of panoramic images) V; sets of image locations X', location of intersection Z and distance threshold T. The operation starts at step 502 by setting the variable bestScore=infinity. In step 504 a loop count of all image indices i=1 to length(X') is set. In step 506 the operations d=EuclideanDistance(X'(i), Z) and score=abs(d−T) are performed. In step 508 it is determined if score is less than bestScore. If so, then in step 510 bestScore is set to score and bestIndex is set to the loop value. Following that or if score was not less than bestScore, then in step 512 it is checked to see if the loop count is done. If not, operation returns to step 506. If so, the operation is complete.

The procedure of FIG. 6 uses inputs of the sets of image locations X1', X2' the indexes k1, k2 and starts with a straight-line path as the initial path. This is shown in step 602 where points Y(1), . . . , Y(n) spaced at equal distance along line connecting X1'(k1) and X2'(k2) are generated with Y(1)=X1'(k1) and Y(n)=X2'(k2). It then gradually adjusts all points along this path so as to minimize a plurality of criteria. This is shown in steps 604 and 606. In step 604 each points sequence Y(1), . . . , Y(n) is optimized to minimize multitude of criteria including: the distance between subsequent points Yi and Y(i+1), the nearness of each point Y(i) to X1' and X2', and the path curvature, measured by the closeness of differences Y(i+1)−Y(i) and Y(i+2)−Y(i+1). These criteria measure the path smoothness; the proximity of the path to recoded panoramic images in the database; and the overall length of the path. Step 606 tests for convergence and repeats step 604 until converged. Those skilled in the art realize that a plurality of optimization methods may be applicable to generate this path, such as the conjugate gradient method.

Figure 7:
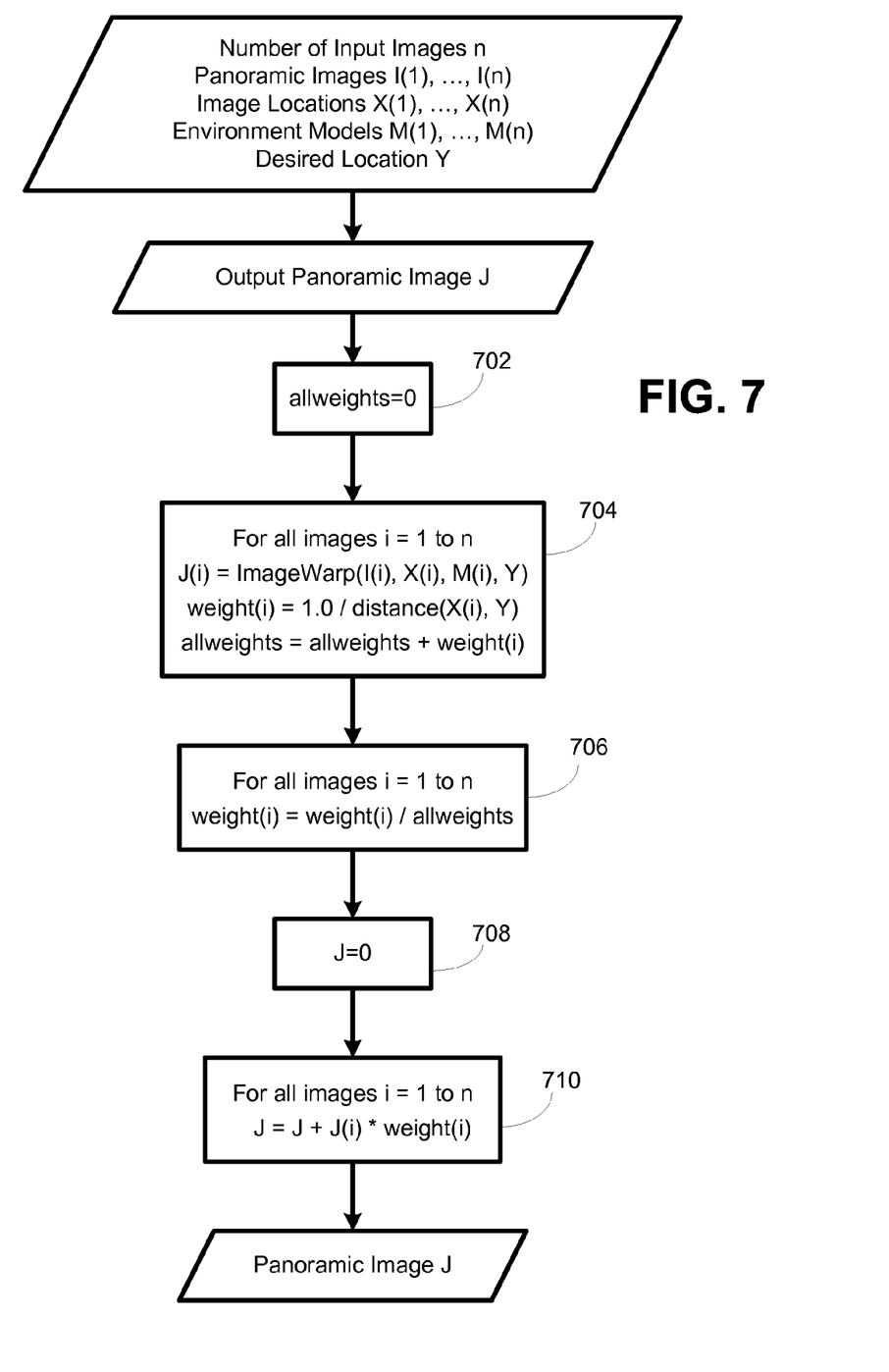

FIG. 7 depicts the preferred embodiment method for warping and blending multiple images. The preferred embodiment uses this procedure for synthesizing new images along the chosen path. The result of this optimization is a smooth transition path between both video sequences.

FIG. 7 uses the number of input images n; panoramic images I(1), . . . , I(n); image locations X(1), . . . , X(n); environment models M(1), . . . , M(n); desired location Y and provides output panoramic image J. In step 702 a variable allweights is set to zero. Then for each image a panoramic image is developed in step 704 using J(i)=ImageWarp(I(i), X(i), M(i), Y). Also in step 704 the variable weight(i) is set to 1.0/distance(X(i), Y) and the variable allweights is set to allweights+weight(i). Then in step 704 for each image the weights are averaged using weight(i)=weight(i)/allweights. In step 708 the panoramic image J is set to zero. In step 710 for all images, the operation J=J+J(i)*weight(i) is performed.

Figure 8:
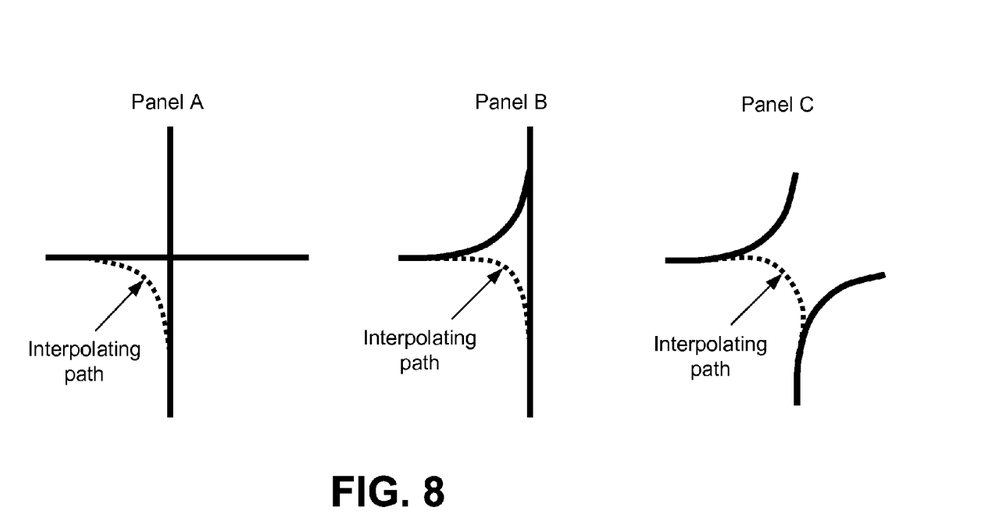
FIG. 8 illustrates the generation of a smooth image transition between two paths, for several possible paths.

FIG. 8 illustrates the generation of a smooth image transition between two paths, by showing via examples the selection of possible paths. Shown in each panel of FIG. 8 are two paths, along with a transition path chosen by this invention. This invention creates images along this transition path, and stitches together segments of the original panoramic video with the newly rendered panoramic images.

The preferred embodiment renders new panoramic views along this path. By stitching together the corresponding video segments with this new synthetic path, a new video is generated that provides to the user a positive viewing experience. The display of the final video is achieved via the procedure outlined in FIG. 9, which concatenates the three video subsequences that result from generating video along the interpolating path.

Figure 9:
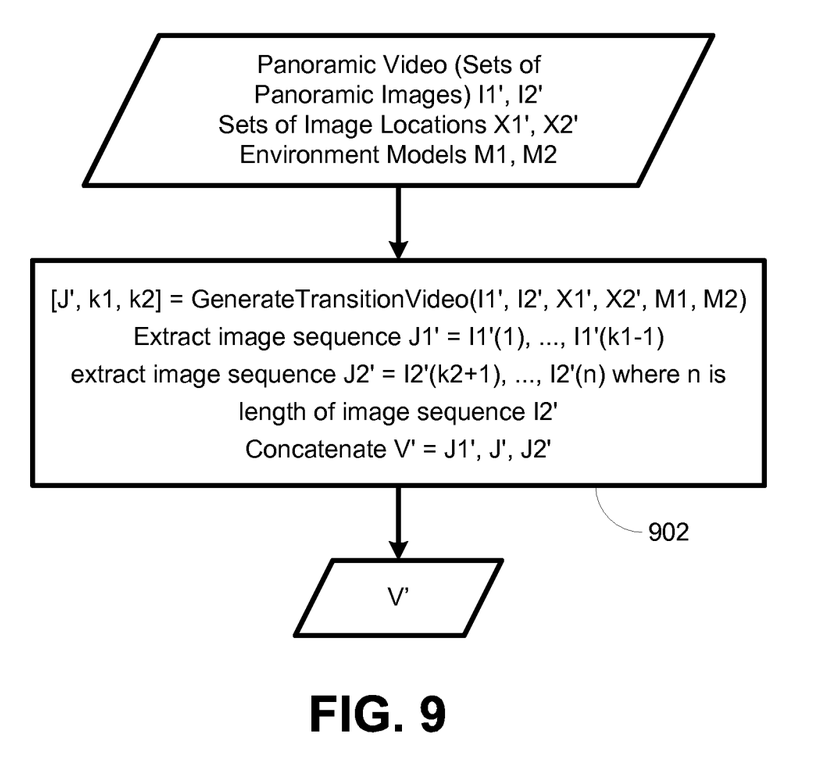
FIG. 9 a flowchart of the algorithm for displaying a video that transitions smoothly between two panoramic videos

The operations of FIG. 9 use panoramic videos (sets of panoramic images) I1', I2', sets of image locations X1', X2' and environment models M1, M2. In step 902 the method determines [J', k1, k2]=GenerateTransitionVideo(I1', I2', X1', X2', M1, M2); extracts image sequence J1'=I1'(1), . . . , I1'(k1−1) and extracts image sequence J2'=I2'(k2+1), . . . , I2'(n) where n is length of image sequence I2'. It then concatenates J1', J', J2' to produce V'.

The preferred embodiment may also be used to reduce bandwidth in client-server applications. For example, a virtual tour might be provided to a user through a Web browser application, in which the images are retried from a remote server through a low-bandwidth communication link. To accommodate low-bandwidth connections, it may be desirable to transmit a reduced set of panoramic images only, spaced at regular distances along the desired path. To generate such a reduced set of panoramic images, a server may analyze the video stream and identify key frames whose geographic locations are approximately a fixed distance apart from each other. It may then repackage those key frames into a new, sparse video, and stream same to client.

Figure 10:
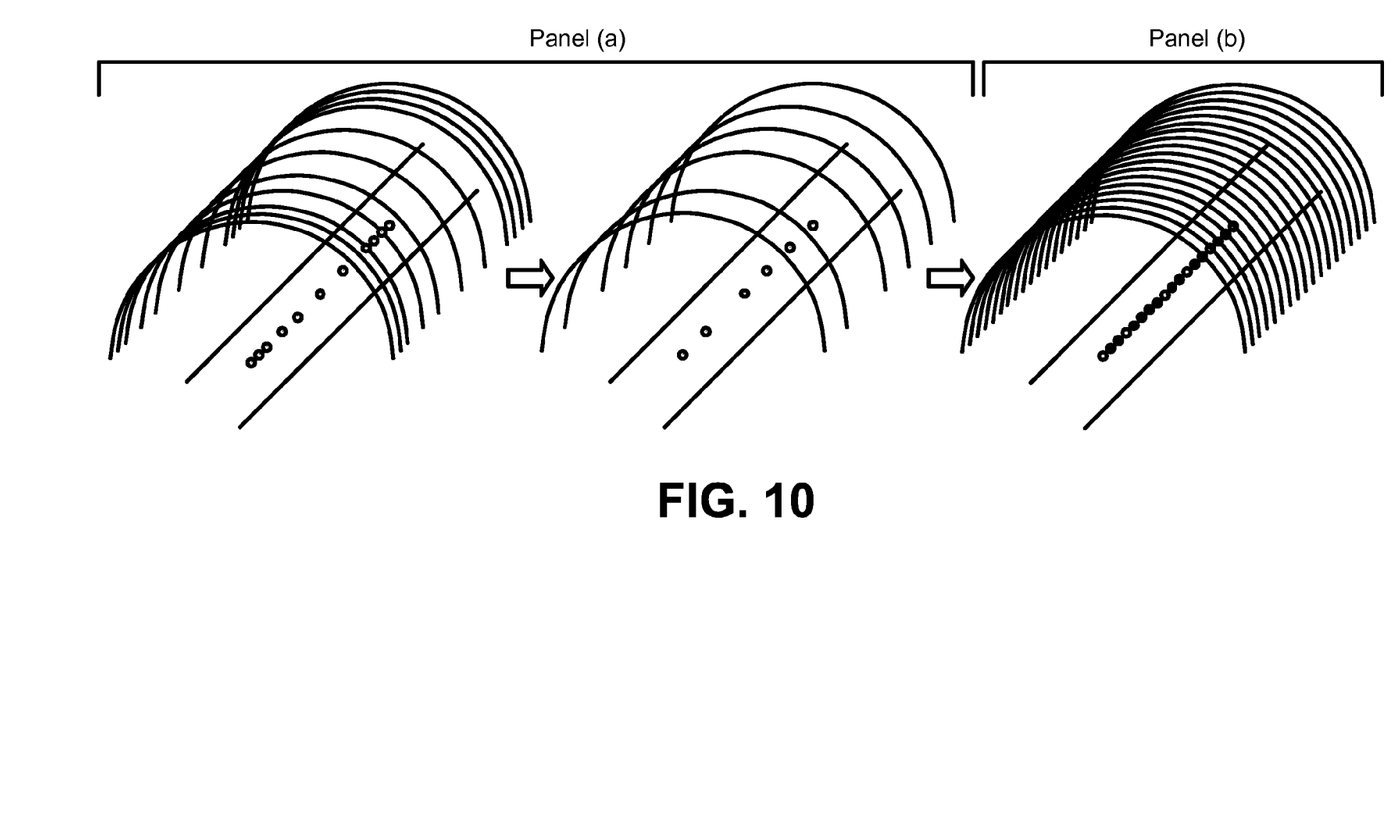
FIG. 10 illustrates the subsampling of a panoramic video into a sparse video defined through equidistant locations and the regeneration of dense panoramic video from this sparse panoramic video.

In such applications, the embodiments will provide the user with an improved viewing experience from such a sparse image stream. FIG. 10 panel (a) illustrates the subsampling of a panoramic video into a sparse video defined through equidistant locations. FIG. 10 panel (b) illustrates the regeneration of dense panoramic video from this sparse panoramic video. In the preferred embodiment, both of these steps are achieved by the same procedure, with different distance thresholds C.

Figure 11:
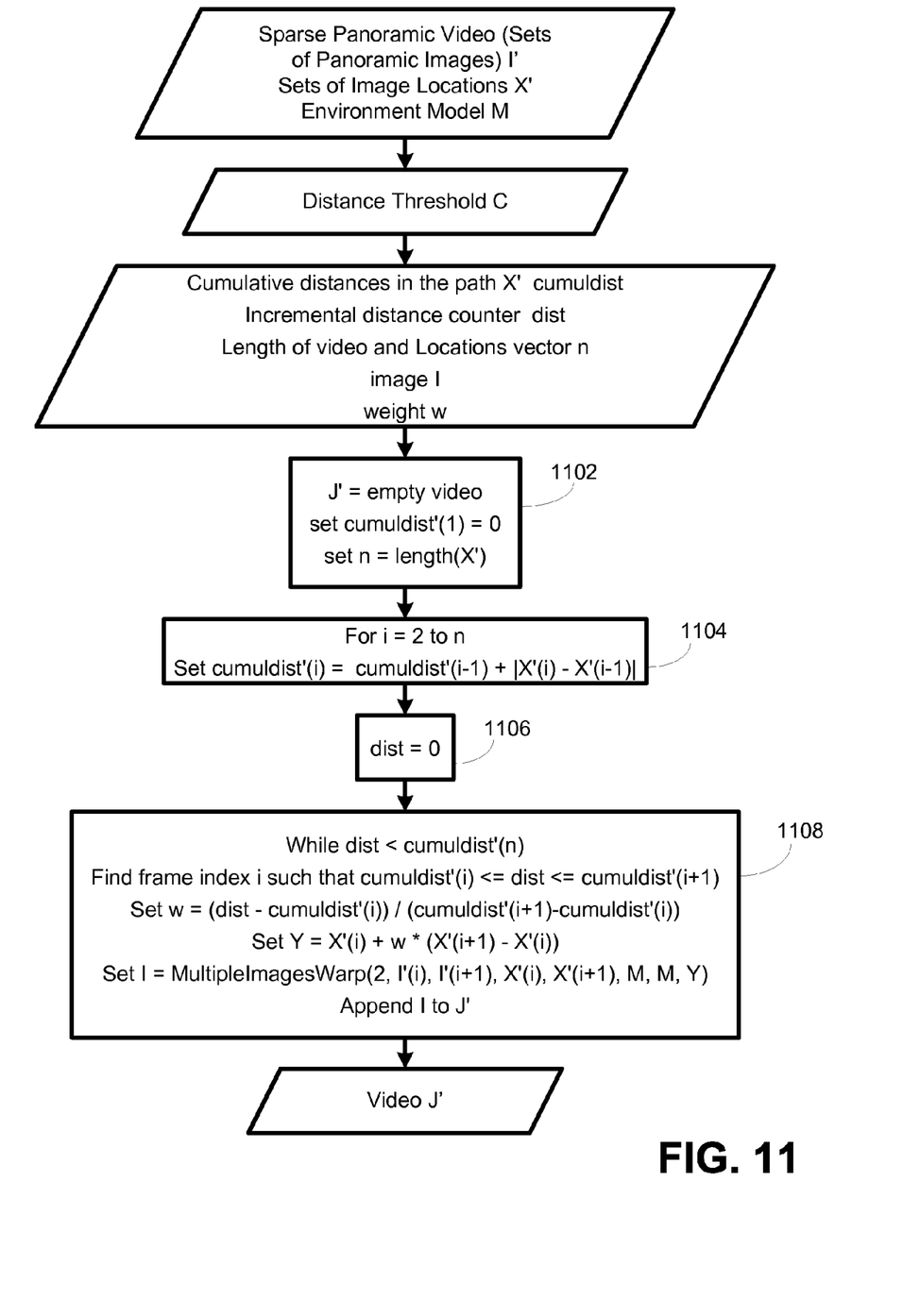
FIG. 11 a flowchart of the algorithm for generating a fixed velocity video. This algorithm can be used to generate dense video from a sparse image sequence.

This procedure is depicted in FIG. 11. It selects images that are a fixed distance apart. For any two adjacent images in the sparse video stream, the present invention makes it possible to generate any number of intermediate panoramic images, along the straight-line path between said images. The sparse video stream is then augmented using said synthesized images, to improve the viewing experience. In doing so, the user experiences a dense sequence of images, of which the majority of images are synthesized from two or more actual images provided by the server.

In FIG. 11 the operation uses sparse panoramic video (sets of panoramic images) I'; sets of image locations X'; environment model M; distance threshold C; cumulative distances in the path X' cumuldist; incremental distance counter dist; length of video and locations vector n; image I and weight w.

In step 1102 J' is set to empty video, cumuldist'(1) is set to zero and n is set to length(X'). Then in step 1104 for each vector, cumuldist'(i) is set to cumuldist'(i−1)+|X'(i)−X'(i−1)|. In step 1106 dist is set to 0. Then in step 1108 for so along as dist is less than cumuldist'(n), various operations are performed. Frame index i is found such that cumuldist'(i)<=dist<=cumuldist'(i+1). Then w is set to (dist−cumuldist'(i))/(cumuldist'(i+1)−cumuldist'(i)). Then Y is set to X'(i)+w*(X'(i+1)−X'(i)). Next I is set to MultipleImagesWarp(2, I'(i), I'(i+1), X'(i), X'(i+1), M, M, Y). Finally I is appended to J', with the final J' being the returned video.

Operations according to the invention may be applied more than once to any given set of panoramic images. For example, in some applications a given panoramic video stream may be augmented using the invention to generate smooth transitions at intersections. A client application may further warp the resulting augmented panoramic video stream so as to emulate views of user-selected viewing locations.

In visual tour applications, the viewer might be embedded in a browser, and the images may be transmitted from a server. Operations according to the invention shall be applicable to both the server and the client, and is not restricted to one specific processing unit. For example, the process of generating smooth video transitions at intersections may be performed on the server side, before streaming video over a low-bandwidth communication link. The server may then stream only a low-bandwidth stream of images, which at the client side are then synthesized into a dense video using the disclosed invention. The invention shall not be specific to any sequence of use, or any location of computation in a distributed computer architecture.

The above disclosure describes the preferred embodiment only. Those familiar with the skill in the art recognize that there are many different embodiments of the said invention. Hitherto we discuss some of the alternative embodiments. This discussion is provided for purposes of illustration only, and thus do not limit the present invention.

In the preferred embodiment, the model M is a sphere of a fixed diameter. Clearly, any alternative surface may be used in the rendering process. For example, alternative embodiments may use approximate 3-D models of the environments. Such models may be acquired through range sensors, such as stereo vision, laser range finders, or radar. They might also be acquired through methods known in the trade as "structure from motion," in which multiple camera images are combined to recover the approximate 3-D structure of the environment. The structure from motion method may utilize methods known in the trade as "optical flow" to establish correspondence between image features in images recorded at nearby locations. Clearly, the invention may use arbitrary environment models for the projection and image warping process. It is in no way limited to the use of a sphere, an ellipsoid, an arbitrary 3-D surface, an actual 3-D model or any other geometric shape.

In the preferred embodiment, the location information of panoramic images is acquired using a GPS system. Clearly, there exist many other methods for acquiring location. For example, in indoor environments, locations may be determined using a process known as "visual odometry," in which subsequent camera images are compared to estimate relative motion. Methods for visual odometry are described in Broida, T. J., Chandrashekhar, S., and Chellappa, R., "Recursive 3-D Motion Estimation from a Monocular Image Sequence," IEEE Transactions on Aerospace and Electronic Systems: 26(4), pp. 639-656, 1990; and for panoramic images in Corke, P. I. and Strelow, D. and Singh, S., "Omnidirectional visual odometry for a planetary rover," Proceedings of the International Conference on Intelligent Robotics and Systems (ISOR), 2004.

In such situations, the coordinate frame used in the location labels may be defined relative to a key image frame, instead of in absolute geographic coordinates. Alternatively, the panoramic images may be acquired with the help of a laser range finder, and a technique known in the trade as "scan matching" may be applied to estimate the camera motion. Scan matching techniques are reviewed in Gutmann, J. S. and Schlegel, C., "AMOS: Comparison of Scan Matching Approaches for Self-Localization in Indoor Environments," Proceedings of the 1st Euromicro Workshop on Advanced Mobile Robots, IEEE Computer Society Press, 1996. Clearly, the present invention is in no way limited to the use of a specific positioning sensor or device, and it may be applied to arbitrary coordinate frame representations.

In the preferred embodiment, new panoramic images are synthesized for new viewing location. Those skilled in the art will easily recognize that the invention allows for change in view orientation, in addition to a change in viewpoint location. The camera orientation of the recorded panoramic images may be specified by three Euler angles relative to some fixed coordinate system, by quaternions, or by any other method or representing orientations. The image warping operation can easily accommodate changes in orientation.

When combining multiple synthetic panoramas into one, the preferred embodiment uses a weighted blending method. Those skilled in the art will easily recognize that there exists a plurality of methods for combining multiple images. For example, multiple images may be stitched together, by decomposing images into regions that are then copied into the target image. Prior to the stitching or blending operation, a local adjustment method may increase the coherence of the panoramic images, so as to increase the realism of the resulting image. Alternative embodiments may also use "optical flow" techniques to establish correspondence between the different images, and use the flow to warp images locally. There exist many different methods of combining multiple panoramic images, and the present description serves only as illustration of the many different methods that may be applicable.

In the preferred embodiment, and iterative optimization method is applied to identify suitable transition paths. Those skilled in the art will easily recognize that there exists a plurality of methods for synthesizing transition paths. For example, such paths may be generated using splines, or methods known as "snakes" or "active contours" in the computer vision literature. Snake and active contour methods are described in Blake, A., and Isard, M., "Active Contours," Springer, Berlin, 1998. Further, the preferred embodiment determines the transition points in the video based on their distance to an intersection location. In alternative embodiments, the algorithm for generating transition paths may select suitable transition points differently, based on criteria that consider the location trajectory underlying each video. There exist a large number of methods for finding transition paths between pairs of points or pairs of paths, which might be brought to bear in alternative embodiments of this invention.

Further, in the preferred embodiment, the image warping process is applied to generate one-dimensional image streams for paths through environments. Such paths are, by definition, one-dimensional. The present invention is in no way restricted to one-dimensional motion through the environment. In alternate embodiments, a user may want to navigate an environment freely in all three dimensions. Such embodiments may use the disclosed invention to synthesize panoramic views for arbitrary motion in all three dimensions, and for arbitrary changes of orientations.

The preferred embodiment assumes the use of panoramic images. Panoramic images facilitate the rendering of new views in that they provide image texture into arbitrary viewing directions. In alternative embodiments, the original image stream may only consist of regular images, and hence the projection into the environment model M may only provide partial texture for the model M. In such embodiments, the rendered images may only be partially defined.

The preferred embodiment assumes that the panoramic images are acquired using a panoramic imaging sensor, which can acquire an entire panoramic image simultaneously. Certain alternative panoramic imaging methods require a user to take many pictures in sequence, which are subsequently combined into a single panoramic image through computer software. Such methods are known in the trade as "image stitching" techniques, see for example see U.S. Pat. No. 5,657,073. In alternative embodiments, said invention is applied to any data acquisition devices capable of generating panoramic images. The present invention makes no assumption whatsoever on the nature of the sensor or imaging method brought to bear for the acquisition of panoramic images.

In the preferred embodiment, the user views the panoramic images as a video, which are projected at a fixed speed. In alternative embodiments, the user may want to look at still images, or move through an image sequence in arbitrary directions and at arbitrary motion speeds. The invention is in no way limited to the replay of video. It is equally applicable to still images, and to viewers that enable the user to adjust the speed and direction in which images are viewed.

The preferred embodiment uses a computer for image display. This invention applies to arbitrary viewing platforms, including but not limited to: electronic billboards, desktop computers, laptops, cell phone, in-car displays, watches, or head-mounted displays. Images generated using the disclosed embodiments may be printed on paper or special foils. They may be viewed through Web browsers or any other software applications capable of rendering images or video. In some embodiments, the panoramic images will be further manipulated to achieve a user-selected effect. For example, those familiar with the skill in the art realize that many viewers of panoramic images allow users to pan, tilt, and zoom into sub-regions of the image. In alternative embodiments, this invention is used to provide panoramic images to such interactive viewers. This invention is in no way limited to a specific viewing modality or method, and the above list serves only as illustration of the many different user interfaces.

While the invention has been particularly shown and described with respect to preferred embodiments thereof, it will be understood by those skilled in the art that changes in form and details may be made therein without departing from the scope and spirit of the invention.

The invention claimed is:
1. An image acquisition system comprising:
a camera for acquiring panoramic images;
a sensor for generating a 3-D environment model;
a positioning system;
a computer system, where the computer system is configured by a first server application and a second server application; and
a panoramic image database;
where the computer system is configured by the first server application to:

receive a plurality of panoramic images captured by the camera;

receive a plurality of locations captured by the positioning system corresponding to positions where the plurality of panoramic images are captured;

generate a plurality of annotated panoramic images by associating the plurality of panoramic images with the corresponding plurality of locations; and upload the plurality of annotated panoramic images to the image database; and where the computer system is configured by the second server application to:

receive a user-selected viewing location;

determine a virtual location corresponding to the user-selected viewing location in the 3-D environment model;

select a subset of panoramic images from the plurality of annotated panoramic images having an annotated location near the virtual location in the 3-D environment model;

project the subset of panoramic images into the 3-D environment model at the virtual location;

blend the projected subset of panoramic images to create a new panoramic image.

2. The image acquisition system of claim 1, wherein the positioning system further comprises a global positioning system and an inertial measurement unit.

3. The image acquisition system of claim 1, wherein the sensor for generating the 3-D environment model is a laser range finder.

4. The image acquisition system of claim 3, further configured to:

acquire environment data using the laser range finder; and
build the 3-D environment model using the environment data.

5. The image acquisition system of claim 1, wherein the 3-D environment model is a sphere.

6. The image acquisition system of claim 1, wherein the plurality of panoramic images are from a video.

7. The image acquisition system of claim 1, wherein the computer system is further configured to blend the projected subset of panoramic images to create a new panoramic image by weighted blending.

8. The image acquisition system of claim 1, wherein the camera for acquiring panoramic images is a plurality of cameras with partially overlapping fields.

9. The image acquisition system of claim 1, wherein the computer system further comprises a user computer system configured to execute a client application in a web browser application.

10. The image acquisition system of claim 1, wherein the computer system further comprises a first computer to utilize the first server application and a second computer to utilize the second server application.

* * * * *